(12) United States Patent  
Lim

(10) Patent No.: US 6,539,580 B2
(45) Date of Patent: Apr. 1, 2003

(54) HINGE ASSEMBLY FOR A COVER

(75) Inventor: Wee Loon Jason Lim, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/839,391

(22) Filed: Apr. 20, 2001

(65) Prior Publication Data

US 2002/0152581 A1 Oct. 24, 2002

(51) Int. Cl.[7] .................................................. E05G 1/08
(52) U.S. Cl. ............................. 16/303; 16/296; 16/335; 16/336
(58) Field of Search ........................... 16/303, 308, 290, 16/291, 296, 297, 342, 341, 335, 336, 280, 285; 379/428, 433, 434, 433.13

(56) References Cited

U.S. PATENT DOCUMENTS

| 4,107,753 | A |   | 8/1978  | Akira |
| 5,111,503 | A | * | 5/1992  | Takagi ........................... 16/260 |
| 5,257,310 | A | * | 10/1993 | Takagi et al. .................. 16/321 |
| 5,335,273 | A |   | 8/1994  | Hisamitsu |
| 5,364,149 | A | * | 11/1994 | Aymerich et al. ............. 16/342 |
| 5,500,982 | A | * | 3/1996  | Hosoi ............................. 16/297 |
| 5,651,063 | A | * | 7/1997  | Ji et al. ......................... 16/335 |
| 5,661,797 | A | * | 8/1997  | Leman et al. .......... 379/433.13 |
| 5,666,694 | A | * | 9/1997  | Slow et al. .................... 16/308 |
| 5,996,178 | A |   | 12/1999 | Murray |

FOREIGN PATENT DOCUMENTS

| DE | 8904737    |   | 6/1989  |
| EP | 0732474    |   | 9/1996  |
| EP | 0961459    |   | 12/1999 |
| JP | 9-170372   | * | 6/1997  |
| JP | 11-230155  | * | 8/1999  |
| JP | 2000-320535| * | 11/2000 |

* cited by examiner

Primary Examiner—Chuck Y. Mah

(57) ABSTRACT

A hinge assembly for use in connecting a cover to a frame of a personal digital assistant (PDA) or the like. The hinge assembly is arranged so that the cover will auto-close or auto-open depending on the angular orientation of the cover.

28 Claims, 4 Drawing Sheets

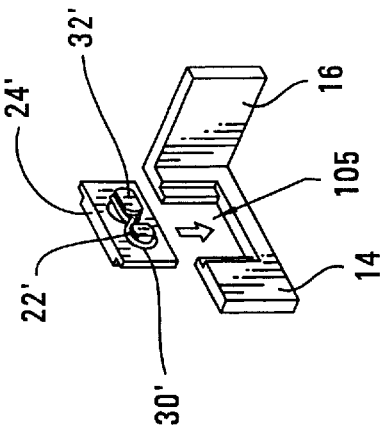
Figure 10
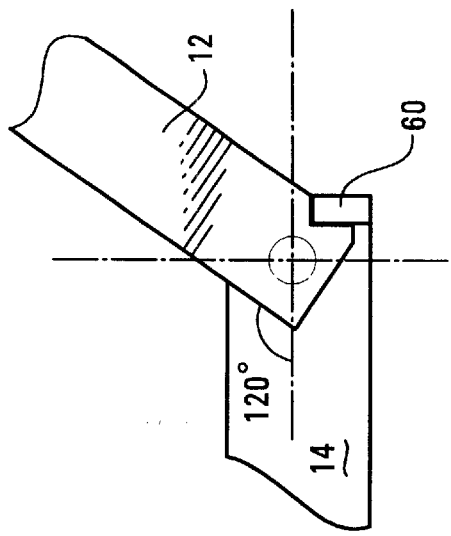
Figure 12
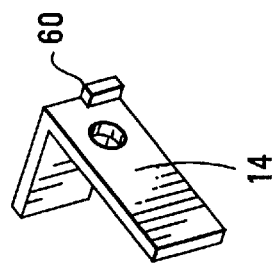
Figure 11
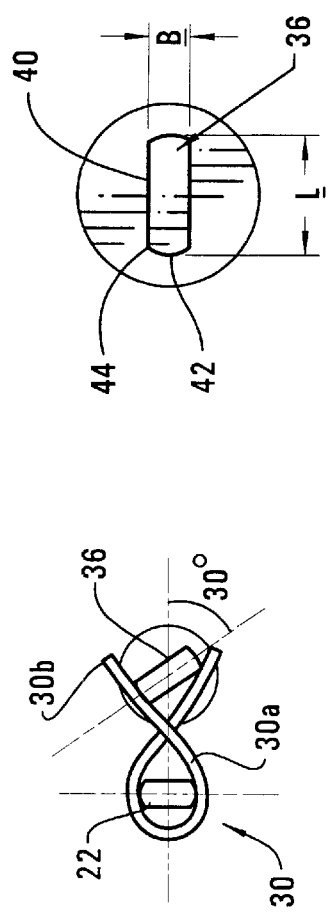
Figure 9
Figure 8
Figure 7

HINGE ASSEMBLY FOR A COVER

FIELD OF THE INVENTION

The present invention relates to a hinge assembly for a cover and more particularly to a hinge assembly used to connect a cover to a frame of a personal digital assistant or the like.

BACKGROUND OF THE INVENTION

Most personal digital assistants (PDA's) have protective plastic covers over their screens to prevent damage thereto. When such covers are used it is important that they can be securely held in either the opened or closed position. To this end, some cover arrangements for PDA's have included catches or stoppers which maintain the cover in the required open or closed position. However, it has been found that over time and with continued use these catches tend to wear thereby preventing the cover from being maintained in the open position. This is a very annoying for the user because the dropping cover will then tend to obscure the user's visibility of the PDA's screen.

U.S. Pat. No. 5,996,178 describes a hinge suitable for use in a foldable electronic device. The hinge system described in U.S. Pat. No. 5,996,178 relies on axial force from the compression spring to cause rotation of the cover. The hinge system is quite complicated and involves a considerable number of parts. The configuration of the hinge system is also such that additional axial space is required to locate the hinge system.

The present invention seeks to provide an improved hinge assembly for the cover of a PDA or the like which securely maintains the cover in the desired open or closed position, that has a reduced number of component parts and which is compact in design.

SUMMARY OF THE INVENTION

According to a first aspect of the present invention there is provided a hinge assembly for connecting a cover to a device, said assembly including a boss member on which a biasing means is arranged to be mounted, a cover connection member arranged to be mounted on said device, said connection member having a first end portion including cam means arranged to interact with at least one portion of said biasing means and a second portion to which said cover is arranged to be connected.

Preferably, said biasing means is a torsion spring.

Preferably, the device has a side wall and the cover connection member is arranged to extend through an aperture in the side wall.

Preferably, the torsion spring includes a circular portion and a pair of elongate portions which extend substantially parallel to one another. As an alternative to the torsion spring including a circular portion, it may include an oval shaped portion.

The boss member preferably includes a body portion and an enlarged end portion. The torsion spring is arranged to be mounted on the boss member so that the circular portion of the torsion spring is located on the body portion of the boss member. The enlarged portion of the boss member serving to prevent the torsion spring from disengaging from the boss member.

Preferably, the cam means of the connection member means includes first and second pairs of opposed parallel surfaces. The first and second pairs of opposed surfaces extending perpendicularly to each other and preferably with each adjacent first and second surface being joined by a curved joining surface.

The first portion of the connection member also includes means to engage against the torsion spring to thereby prevent the connection member from inadvertently disengaging from the aperture formed in the side wall. The engagement means preferably includes an enlarged portion adjoining the cam means and arranged to contact against at least one of the elongate portions of the torsion spring so as to thereby prevent the connection member from returning through the aperture formed in the side wall.

The second portion of the connection member preferably includes first and second cylindrical portions. The aperture located within the side wall of the device is preferably configured to receive said first and second cylindrical portions of the connection means so that the connection means can rotate there within.

The configuration of the first and second cylindrical portions and the aperture being arranged to prevent the connection member from passing all the way through the aperture.

The first cylindrical portion is preferably located adjacent the cam means and has a reduced diameter as compared with the diameter of the second cylindrical portion.

The cover and an end part of the second cylindrical portion of the connection member preferably include complimentary shaped connectors to enable the cover to be connected to the connection member. The complimentary shaped connectors preferably include male and female connectors. The male connector is preferably located on the cover and may adopt a "cross" or "minus" cross-sectional configuration. The male or female connector on the cover is preferably formed on a hinge member which extends from the cover. The cover preferably includes a pair of hinge members, each hinge member having a connector mounted or formed thereon which is arranged to be received in a respective complimentary connection member formed in respective side walls of the device.

The boss member and the connection member are preferably made from a plastics materials. The cover is also preferably made from a plastics material.

According to a second aspect of the invention there is provided an assembly including a device having opposed side walls, a cover arranged for connection to the device and at least one hinge assembly, said at least one hinge assembly including a boss member on which a torsion spring is arranged to be mounted, a cover connection member arranged to be mounted on one of said side walls, said connection member having a first portion including cam means arranged to interact with at least one portion of said torsion spring and a second portion to which said cover is arranged to be connected.

Preferably, the assembly includes a pair of hinge assemblies.

According to a third aspect of the invention there is provided a hinge assembly for connecting a cover to a device, the cover being arranged to move between a fully open and a fully closed position, the hinge assembly including a cover connection member arranged to join said cover to said device and biasing means arranged to engage with a portion of said connection member and to bias said cover towards either said fully opened or said fully closed position depending on the orientation of the connection member.

BRIEF DESCRIPTION OF THE DRAWINGS

An embodiment of the invention will now be described, by way of example only, with reference to the accompanying drawings in which:

FIG. 7 is an end view of the connection member showing the female connection into which the male connection of the cover is arranged to be attached.

FIG. 8 details the angular position of the cam when the cover is in a closed position.

FIG. 9 provides references for detailing a preferred ratio of the first and second cam surfaces of the cam.

FIG. 10 details the angular position of the cam when the cover is in the fully opened position.

FIG. 11 is a partial side view of the frame showing a cover connected thereto and a stopper.

FIG. 12 details a "plug and play" embodiment of the hinge assembly.

DETAILED DESCRIPTION OF THE PREFERRED EMBODIMENTS

Figure 1:
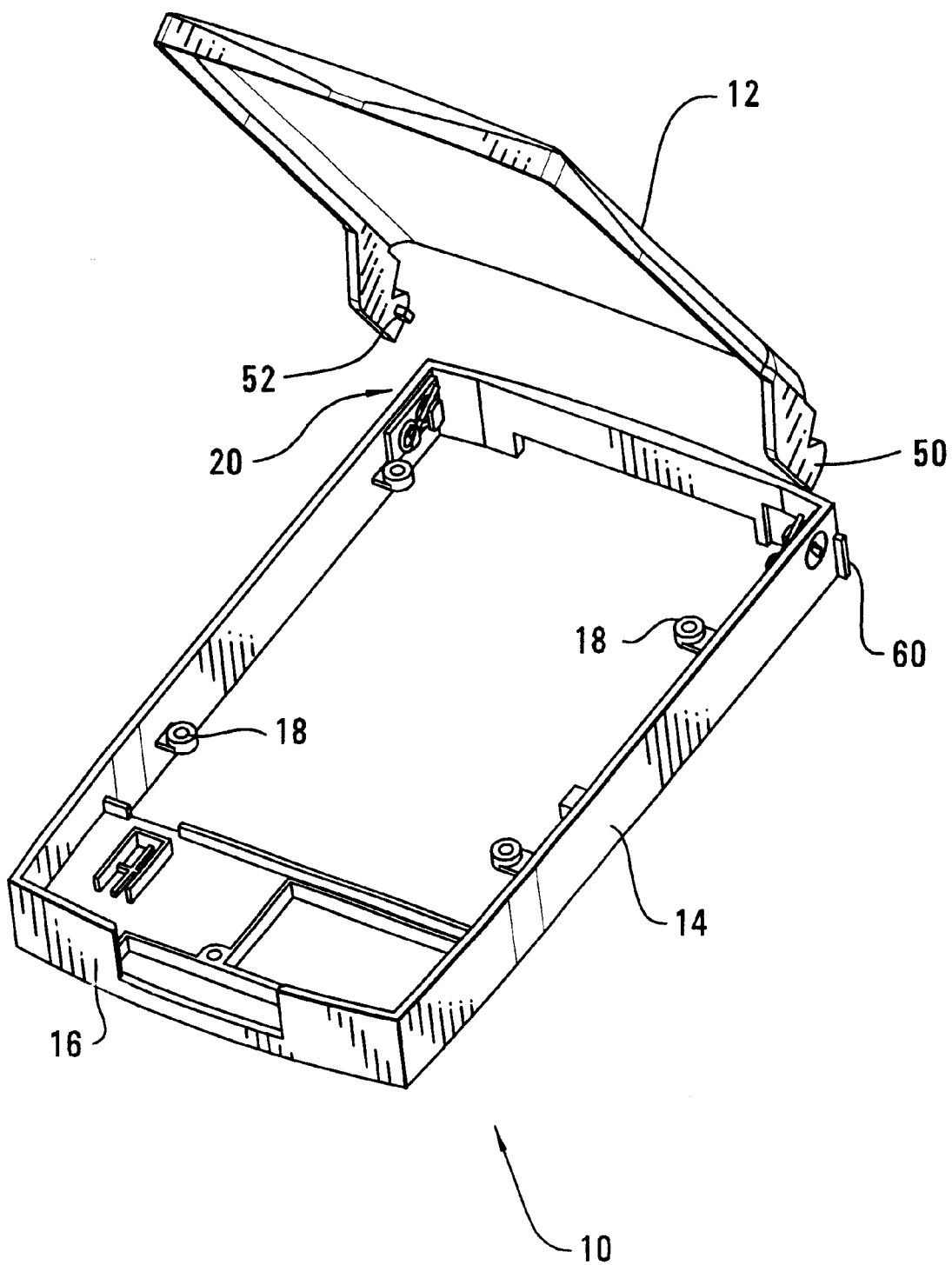
FIG. 1 is a perspective view of a PDA frame and a cover prior to attachment thereto.
Figure 2:
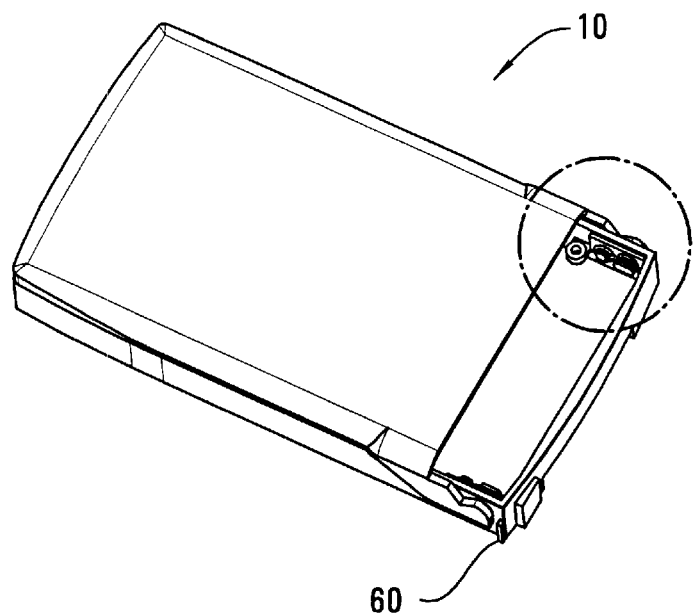
FIG. 2 is a perspective view of a cover attached to a PDA and with the cover in the closed position.
Figure 3:
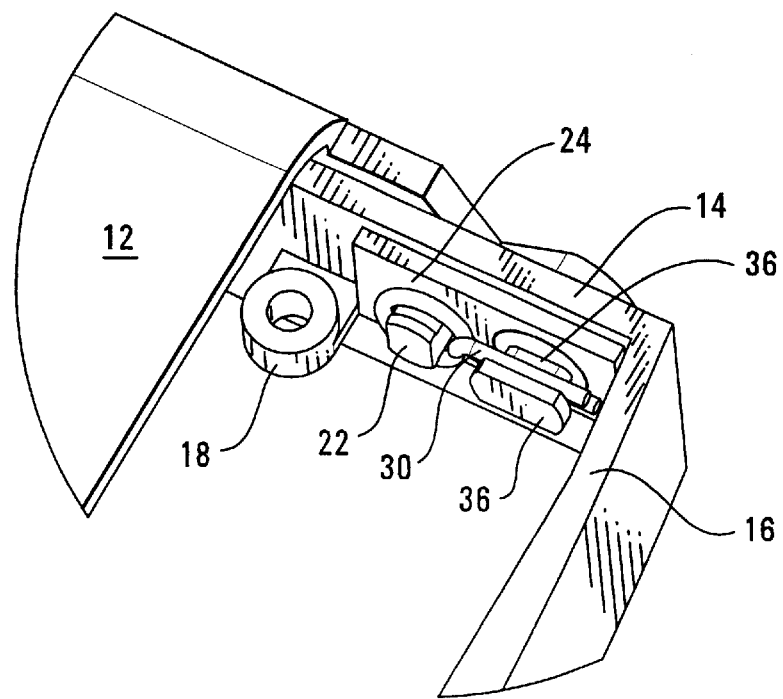
FIG. 3 is an enlarged view of the circled portion shown in FIG. 2.
Figure 6:
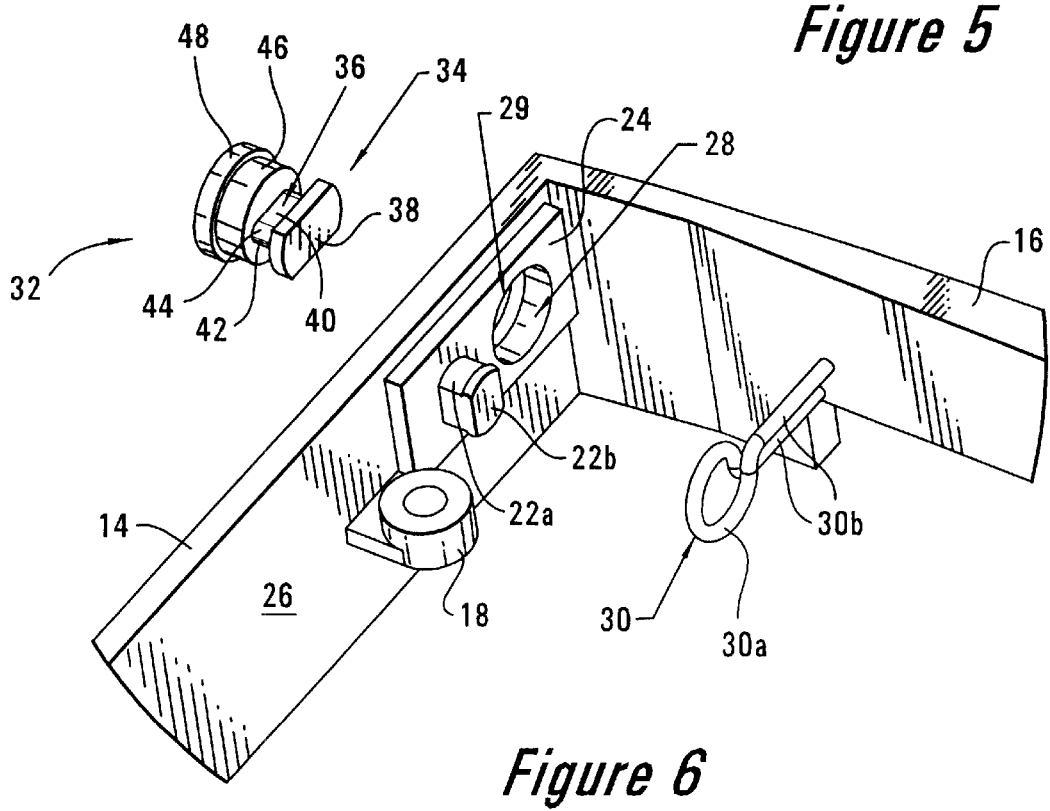
FIG. 6 is an assembly view showing the connection member, torsion spring and a portion of a PDA frame.

FIG. 1 illustrates a frame 10 arranged to receive a PDA (and other electrical components) and a pivotal cover 12. The frame 10 includes first and second pairs of opposed side walls 14, 16 arranged so as to enable a PDA to be located therewithin. The PDA is arranged to be secured to the frame 10 by four threaded connectors (not shown) which are arranged to pass through anchor points 18 and into the underside of the PDA. The cover 12 is arranged to be hingedly connected to the frame 10 by a pair of hinge assemblies 20. The configuration of the hinge assemblies 20 is best illustrated in FIGS. 3 and 6.

Each hinge assembly 20 includes a boss member 22 having a main body 22a and an enlarged head 22b. The boss member 22 is integrally formed or attached to a mounting plate 24. Mounting plate 24 is arranged to be located on an inner side 26 of one of the first side walls 14. The mounting plate 24 has a circular aperture 28 formed therein which is positioned for coaxial alignment with an aperture 29 which extends through the side wall 14.

The hinge assembly 20 also includes a torsion spring 30 which is arranged to be mounted on the boss member 22 and a cover connection member 32. The cover connection member 32 includes a first portion 34 which incorporates a cam 36 and an engagement member 38. The cam 36 is formed by first and second pairs of opposed cam surfaces 40, 42. Extending between each adjacent first and second cam surface 40, 42 is a curved joining surface 44. The function of the cam 36, the first pair of opposed cam surfaces 40, the second pair of opposed cam surfaces 42 and joining surfaces 44 will be described in more detail below.

The second end portion of the cover connection member 32 includes first and second cylindrical portions 46, 48. The first cylindrical portion 46 is located adjacent the cam 36 and is of reduced diameter when compared with the diameter of the second cylindrical portion 48. The diameters of the first and second cylindrical portions 46, 48 are such that they respectively fit within the apertures 28,29 to prevent the connection member 32 from passing entirely inwardly through the apertures 28, 29, whilst still allowing the connection member 32 to freely rotate therewithin.

The torsion spring 30 includes a circular portion 30a and a pair of elongate portions 30b which extend substantially parallel to one another. The circular portion 30a of the torsion spring 30 is sized so that it can be passed over the boss member 22 and located on the main body 22a of the boss member 22. The enlarged head 22b of the boss member 22 is sized so as to prevent the torsion spring 30 from inadvertently being removed from the boss member 22.

To assemble the hinge assembly 20 to the first side wall 14, the connection member 32 must first be located within the coaxially aligned apertures 28, 29 formed respectively within the mounting plate 24 and the side wall 14. When the connection member 32 is correctly located within these apertures 28, 29 the cam 36 and engagement member 38 protrude beyond the vertical plane of the mounting plate 24. The elongate portions 30b of the torsion spring 30, are then arranged so that they extend against the opposed surfaces 42 of the cam 36. Thereafter, the circular portion 30a of the torsion spring 30 is pushed over the enlarged head 22b of the boss member 22 so that the circular portion 30a of the torsion spring 30 is located around the main body 22a of the boss member 22. FIG. 3 shows clearly each of the elongate portions 30b of the torsion spring 30 positioned against a respective one of the first cam surfaces 40.

Figure 4:
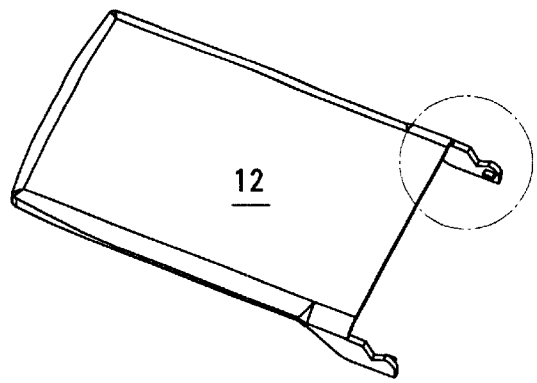
FIG. 4 is a perspective view of the cover shown in FIG. 1.
Figure 5:
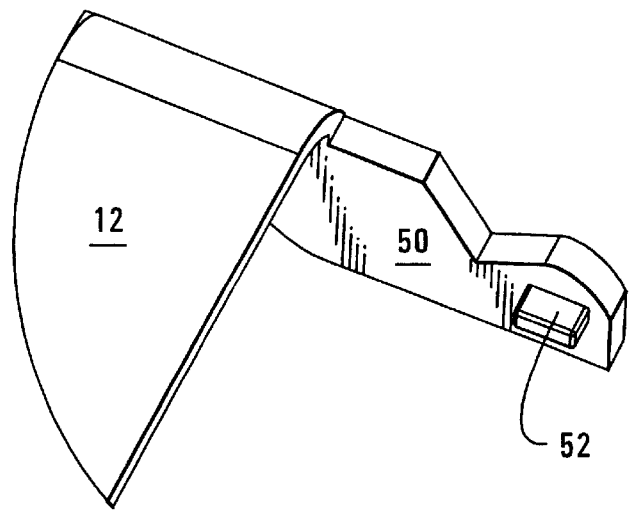
FIG. 5 is an enlarged view of the circled portion shown in FIG. 4.

As best illustrated in FIGS. 4 and 5, the cover 12 includes depending hinge members 50 which each have a connector 52 attached or formed thereto. As illustrated in FIG. 5, the connector 52 of this embodiment is a "minus shaped" male connector 52. The male connector 52 is arranged to be received within a complementary shaped female connector 54 formed in the end face 48a of the second cylindrical portion 48 of the connection member 32. The complementary shaped female connector 54 is best shown in FIG. 8.

As illustrated in FIG. 1, a hinge assembly 20 is arranged to be connected to the upper portion of each of the first side walls 14. The cover 12 with hinge members 50 is then connected to the frame 10 by outwardly flexing each of the hinge members 50 so that the male shaped connectors 52 pass over their respective side walls 14. The male shaped connectors 52 are then located within their respective female connectors 54 formed in the end face 48a of their respective connection members 32. FIG. 3 illustrates the connection of one hinge member 50 to its respective hinge assembly 20. The cover 12 as illustrated in FIG. 3 is in the closed position.

When the cover 12 is in the closed position, the elongate portions 30b of the torsion spring 30 contact against respective first surfaces 40 of the cam 36 and the cam 36 extends at an angle of approximately 30 degrees to the horizontal. This is best illustrated in FIG. 8.

When the user rotates the cover 12 to move it into an open or in-use position, the engagement between the male connector 52 and the connection member 32 causes the connection member 32 to rotate within the apertures 28, 29. As this occurs, the first pair of cam surfaces 40 of the cam 36 are also caused to rotate. However, this rotational movement of the connection member 32 is resisted by the contact between the elongate portions 30b of the torsion spring 30 and the first pair of cam surfaces 40. Accordingly, this resistance by the torsion spring 30 tends to return the cover 12 to the closed position. This provides an "auto-close" feature for the cover 12. Continued rotation of the cover 12 towards the in-use position overcomes this resistance so that the elongate portions 30b of the torsion spring begin to come into contact with the curved joining surfaces 44 of the cam 36. As this occurs the cam 36 is said to reach a neutral or toggle position. If the cover 12 is then rotated further towards the in-use position, the connection member 32 will also rotate until the elongate portions 30b of the torsion spring 30 come into contact with the second pair of cam surfaces 42 of the cam 36. When the elongate portions 30b of the torsion spring 30 contact the second pair of cam surfaces 42 of the cam 36 the cover 12 is snapped to the open or in-use position. This results in the cover 12 having an "auto open" feature.

As best illustrated in FIG. 11, a stopper 60 is provided on the outer side of the side wall 14 of the frame 10. The stopper 60 is arranged to engage with a portion 12d of the cover 12 so as to prevent the cover 12 from moving once the cover 12 has reached an inclination of 120° from the horizontal. As the stopper 60 prevents any additional pivotal movement of the cover 12, the resistive force of the torsion spring 30 will try to open the cover 12 further, thereby resulting in the cover 12 being held firmly in the open or in-use position.

It will be appreciated from the above description that the configuration of the cam 36 and its relationship with the elongate portions 30b of the torsion spring 30 is such that the torsion spring 30 tends to hold the cam 36 and the connected cover 12 in the closed position until the cover 12 is rotated past the neutral or toggle position. If rotation of the cover 12 is stopped before the cam 36 reaches the neutral or toggle position, the cover 12 will snap to the closed position. However, once the cover 12 is rotated past this neutral or toggle position, the elongate portions 30b of the torsion spring 30 will contact the second cam surfaces 42 and thus the cover 12 will be raised to the fully opened position. The cover 12 will be held in the fully opened or in-use position under the action of the torsion spring 30.

In a particularly preferred embodiment of the invention, the cover 12 can be fully opened to an angle of approximately 120 degrees to the horizontal. The neutral or toggle position of the cam 36 occurs when the first pair of opposed surfaces 40 are at an angle of 90 degrees to the horizontal. This is best illustrated in FIG. 10.

In order to obtain the required tactile feel when opening the cover 12, or in other words to achieve the desired opening smoothness, the cam ratio as best illustrated in FIG. 9 should preferably be L/B=3.4/1.3=2.6.

The hinge assembly 20 described above is considered to be advantageous because it is simple in construction and uses a minimum number of component parts. Furthermore, the inclusion of this type of hinge assembly does not increase the axial dimension of the PDA frame. This is extremely important so that the size of the combined PDA and cover can be maintained as small as possible.

The hinge assembly 20 of an embodiment of the present invention provides a reliable method by which the cover 12 can be maintained in either the closed or open position and no additional locks or catches are required in order to ensure that the cover is maintained in the required position. Furthermore, the hinge assembly 20 is made of lightweight plastics material and therefore does not greatly increase the overall weight of the device.

It will be appreciated by those skilled in the art that although the male connector 52 on the cover 12 is described as having a "minus shaped" configuration other configurations are envisaged. For example, the connector 52 may adopt a "cross shaped" or "star shaped" configuration. It is also envisaged that the connector 52 on the hinge member 50 may be a female connector which is arranged to receive a male connector 54 formed on the connector member 32. The only limitation to the configuration of the connector 52 is that is must properly engage with the complementary shaped connector of the connection member 32 so that rotational movement of the cover 12 results in rotational movement of the connector member 32.

It will also be appreciated by those skilled in the art that the hinge member 50 must be sufficiently flexible to enable it to be flexed outwardly so that the connector 52 can pass over the side wall 14 and then be located within the complementary shaped connector 54 formed in the connection member 32.

It is envisaged that the hinge assembly previously described could be modified for "plug and play" installations. As shown in FIG. 12 such a "plug and play" assembly 100 would include a mounting plate 24', a boss member 22', a torsion spring 30' and a cover connection member 32'. These components would be pre assembled so that they could simply be plugged or slotted onto a frame 10'. The frame 10' would include an appropriately positioned groove 105 or aperture which is shaped to receive and engage with the mounting plate 24'.

While the embodiments described herein are preferred, it will be appreciated from the specification that various alternatives, modifications, variations or improvements therein which may be made by those skilled in the art are within the scope of the invention, which is defined by the claims.

What is claimed is:

1. A hinge assembly for connecting a cover to a device, said assembly including a boss member on which a biasing means is arranged to be mounted, a cover connection member arranged to be rotatably mounted on said device, said cover connection member having a first portion including cam means arranged to interact with at least one portion of said biasing means and a second portion arranged to be directly connected to said cover by connection means, said connection means including complimentary male and female shaped connectors formed on the second portion and the cover.

2. A hinge assembly according to claim 1 wherein the biasing means includes a torsion spring.

3. A hinge assembly according to claim 2 wherein the device has a side wall and the cover connection member is arranged to extend through an aperture in the side wall.

4. A hinge assembly according to claim 2 wherein the torsion spring includes a circular portion and a pair of elongate portions which extend substantially parallel to one another.

5. A hinge assembly according to claim 4 wherein the boss member includes a body portion and an enlarged end portion and the torsion spring is arranged to be mounted on the boss member so that the circular portion of the torsion spring is located on the body portion of the boss member and the enlarged end portion serves to prevent inadvertent release of the torsion spring from the boss member.

6. A hinge assembly according to claim 2 wherein the first portion of the connection member also includes means to engage against the torsion spring to thereby prevent the connection member from inadvertently disengaging from an aperture formed in the side wall.

7. A hinge assembly according to claim 6 wherein the engagement means includes an enlarged portion adjoining the cam means which is arranged to contact against a portion of the torsion spring so as to thereby prevent the connection member from returning through the aperture formed in the side wall.

8. A hinge assembly according to claim 7 wherein an aperture located within the side wall of the device is configured to receive said first and second cylindrical portions of the connection means so that the connection means can rotate there within.

9. A hinge assembly according to claim 1 wherein the cam means of the connection member means includes first and second pairs of opposed parallel surfaces.

10. A hinge assembly according to claim 9 wherein the first and second pairs of opposed surfaces extend perpendicularly to each other.

11. A hinge assembly according to claim 9 wherein each adjacent first and second surface is joined by a curved joining surface.

12. A hinge assembly according to claim 1 wherein the second portion of the connection member includes first and second cylindrical portions.

13. A hinge assembly according to claim 12 wherein the first cylindrical portion is located adjacent the cam means.

14. A hinge assembly according to claim 12 wherein the first cylindrical portion has a reduced diameter as compared with the diameter of the second cylindrical portion.

15. A hinge assembly according to claim 14 wherein a male connector is located on the cover and adopts a "cross" or "minus" cross-sectional configuration.

16. A hinge assembly according to claim 1 wherein the connector on the cover is located on a hinge member which extends from the cover.

17. A hinge assembly according to claim 1 wherein the boss member and the connection member are made from a plastics material.

18. A hinge assembly according to claim 1 wherein the cam means has a neutral or toggle position such that if the cam means is rotated beyond the neutral or toggle position, the cover connection member is caused to move the cover to a fully opened position.

19. A hinge assembly according to claim 18 wherein the neutral or toggle position of the cam means occurs when a cam surface of the cam means is located at an angle of approximately 90 degrees to an imaginary horizontal line which extends substantially parallel to a portion of the biasing means that engages with the portion of said connection member.

20. A hinge assembly according to claim 19 wherein when the cover is at the fully opened position it is at an angle of approximately 120 degrees to said imaginary horizontal line.

21. An assembly including a device having opposed side walls, a cover arranged for connection to the device by at least one hinge assembly, said at least one hinge assembly including a boss member on which a torsion spring is arranged to be mounted, a cover connection member arranged to be mounted on one of said side walls, said connection member having a first portion including cam means arranged to interact with at least one portion of said torsion spring and a second portion arranged to be directly connected to said cover by connection means, said connection means including complimentary male and female shaped connectors formed on the second portion and the cover.

22. An assembly according to claim 21 wherein a pair of said hinge assemblies are provided for connection of the cover to the device.

23. A hinge assembly for connecting a cover to a device, the cover being arranged to move between a fully open and a fully closed position, the hinge assembly including a cover connection member arranged to join said cover to said device and biasing means arranged to engage with a portion of said connection member and to bias said cover towards either said fully opening or said fully closed position depending on the orientation of the connection member, said connection member having a first portion including cam means arranged to interact with at least one portion of said torsion spring and a second portion arranged to be directly connected to said cover by connection means, said connection means including complimentary male and female shaped connectors formed on the second portion and the cover.

24. A hinge assembly according to claim 22 where the biasing means includes a torsion spring.

25. A hinge assembly according to claim 23 including a stopper mounted on at least one of the opposed side walls, said stopper being arranged to prevent movement of the cover once is has reached a required fully opened position.

26. A hinge assembly according to claim 23 wherein the cover connection member is arranged to be mounted in an aperture formed in a side wall of a frame arranged to hold the device.

27. A hinge assembly for connecting a cover to a device, said device having first and second pairs of opposed side walls, said assembly comprising a boss member arranged to be mounted on one of said first side walls, a biasing means arranged to be mounted on said boss member, a cover connection member arranged to be rotatably mounted in an aperture formed in said one of said first side walls, said cover connection member having a first portion including cam means arranged to interact with at least one portion of said biasing means and a second portion arranged to be directly connected to said cover by connection means, and said connection means including complimentary male and female shaped connectors formed on the second portion and the cover.

28. A hinge assembly for connecting a cover to a device according to claim 27 wherein the boss member includes a mounting plate which is arranged to be mounted on said one of said first side walls and a head, the mounting plate including an aperture which is sized that the first portion can extend there through.

* * * * *